US011286729B2

(12) United States Patent
Mackay et al.

(10) Patent No.: US 11,286,729 B2
(45) Date of Patent: Mar. 29, 2022

(54) SLIMLINE STOP COLLAR

(71) Applicant: DOWNHOLE PRODUCTS LIMITED, Aberdeen (GB)

(72) Inventors: Alexander Craig Mackay, Aberdeen (GB); Keith David Bradford, Aberdeen (GB)

(73) Assignee: DOWNHOLE PRODUCTS LIMITED, Portlethen (GB)

(*) Notice: Subject to any disclaimer, the term of this patent is extended or adjusted under 35 U.S.C. 154(b) by 385 days.

(21) Appl. No.: 16/535,954

(22) Filed: Aug. 8, 2019

(65) Prior Publication Data
US 2020/0109607 A1 Apr. 9, 2020

Related U.S. Application Data

(60) Provisional application No. 62/741,671, filed on Oct. 5, 2018.

(51) Int. Cl.
| *E21B 17/16* | (2006.01) |
| *E21B 19/16* | (2006.01) |
| *B25B 27/10* | (2006.01) |
| *E21B 17/10* | (2006.01) |
| *E21B 17/04* | (2006.01) |
| *F16D 1/08* | (2006.01) |
| *E21B 17/00* | (2006.01) |

(52) U.S. Cl.
CPC .............. *E21B 17/16* (2013.01); *B25B 27/10* (2013.01); *E21B 17/006* (2013.01); *E21B 17/04* (2013.01); *E21B 17/1078* (2013.01); *E21B 19/16* (2013.01); *F16D 1/0858* (2013.01)

(58) Field of Classification Search
CPC ........ E21B 17/16; E21B 17/006; E21B 17/04; E21B 17/1078; E21B 19/16; B25B 27/10; F16D 1/0858
See application file for complete search history.

(56) References Cited

U.S. PATENT DOCUMENTS

| 3,799,277 A * | 3/1974 | Kellner ..................... E21B 7/04 175/94 |
| 4,101,179 A | 7/1978 | Barron |
| 4,384,626 A | 5/1983 | Derouin |
| 5,860,760 A | 1/1999 | Kirk |
| 8,832,906 B2 | 9/2014 | Buytaert |
| 9,598,913 B2 | 3/2017 | Buytaert |
| 9,963,942 B2 | 5/2018 | Eidem |

(Continued)

OTHER PUBLICATIONS

Eurasian Search Report dated May 14, 2020.
Extended European Search Report; European Patent Application No. 19192335.8-1002; dated Feb. 13, 2019.

*Primary Examiner* — Aaron L Lembo

(57) ABSTRACT

A stop collar for mounting to a downhole tubular includes: a cylindrical housing having a threaded inner surface and a tapered inner surface; a compressible slip ring having teeth formed in an inner surface thereof and a pair of tapered outer surfaces; a compressible cam ring having a tapered inner surface; and a cylindrical bolt having a threaded outer surface. A natural outer diameter of each ring is greater than a minor diameter of the threaded surfaces. Screwing the threaded surfaces of the housing and the bolt is operable to drive the tapered surfaces together, thereby compressing the slip ring such that the teeth engage a periphery of the tubular.

13 Claims, 14 Drawing Sheets

(56) References Cited

U.S. PATENT DOCUMENTS

| | | |
|---|---|---|
| 9,982,494 B2 | 5/2018 | Steine |
| 2003/0006609 A1* | 1/2003 | Yates .................. F16L 37/0915 |
| | | 285/39 |
| 2014/0000900 A1* | 1/2014 | Leiper ..................... E21B 17/04 |
| | | 166/311 |
| 2016/0376852 A1 | 12/2016 | Gynz-Rekowski |

* cited by examiner

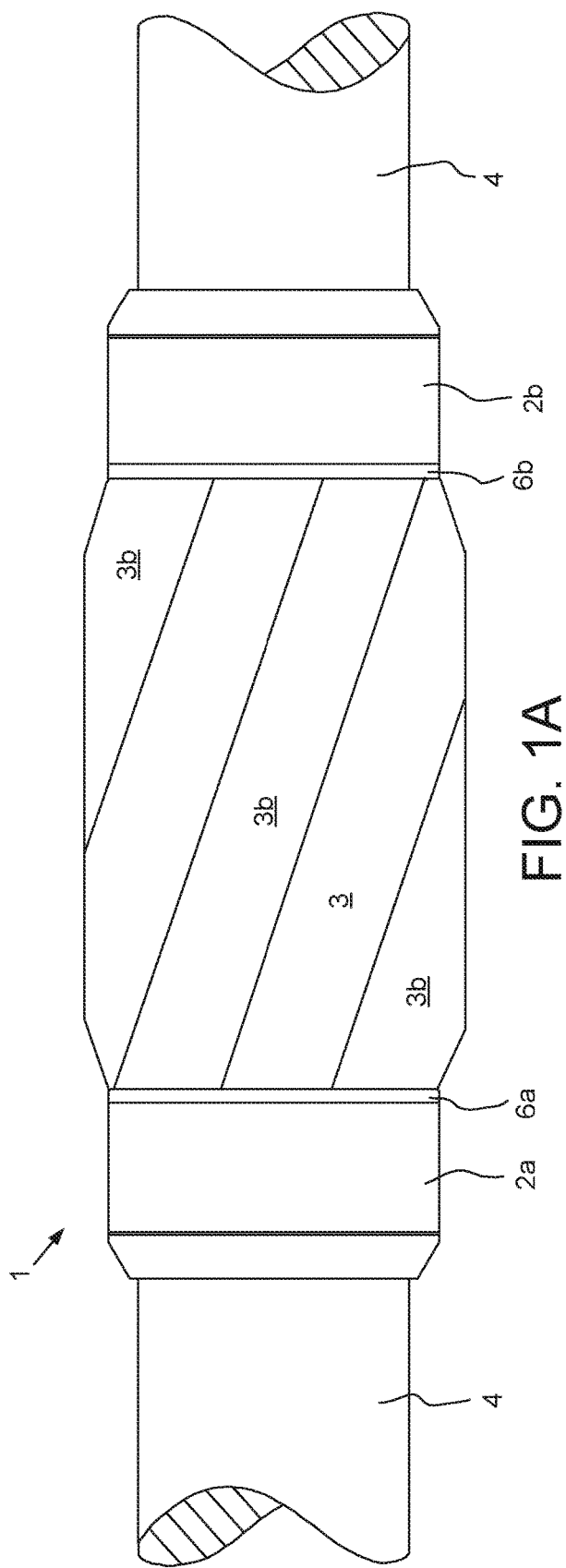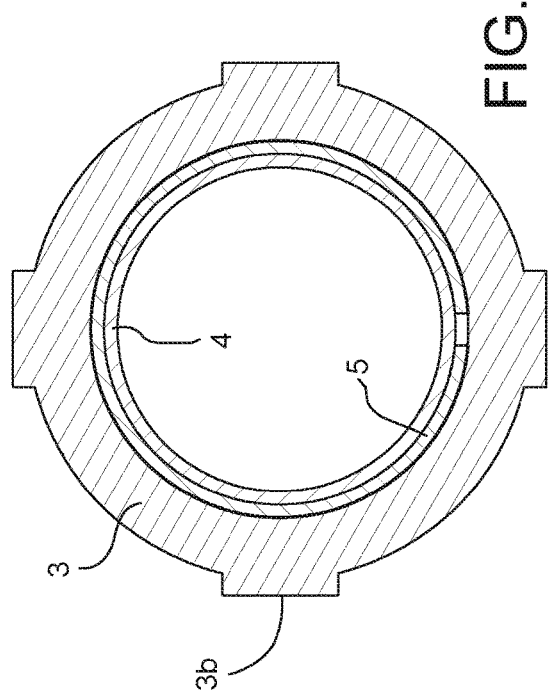

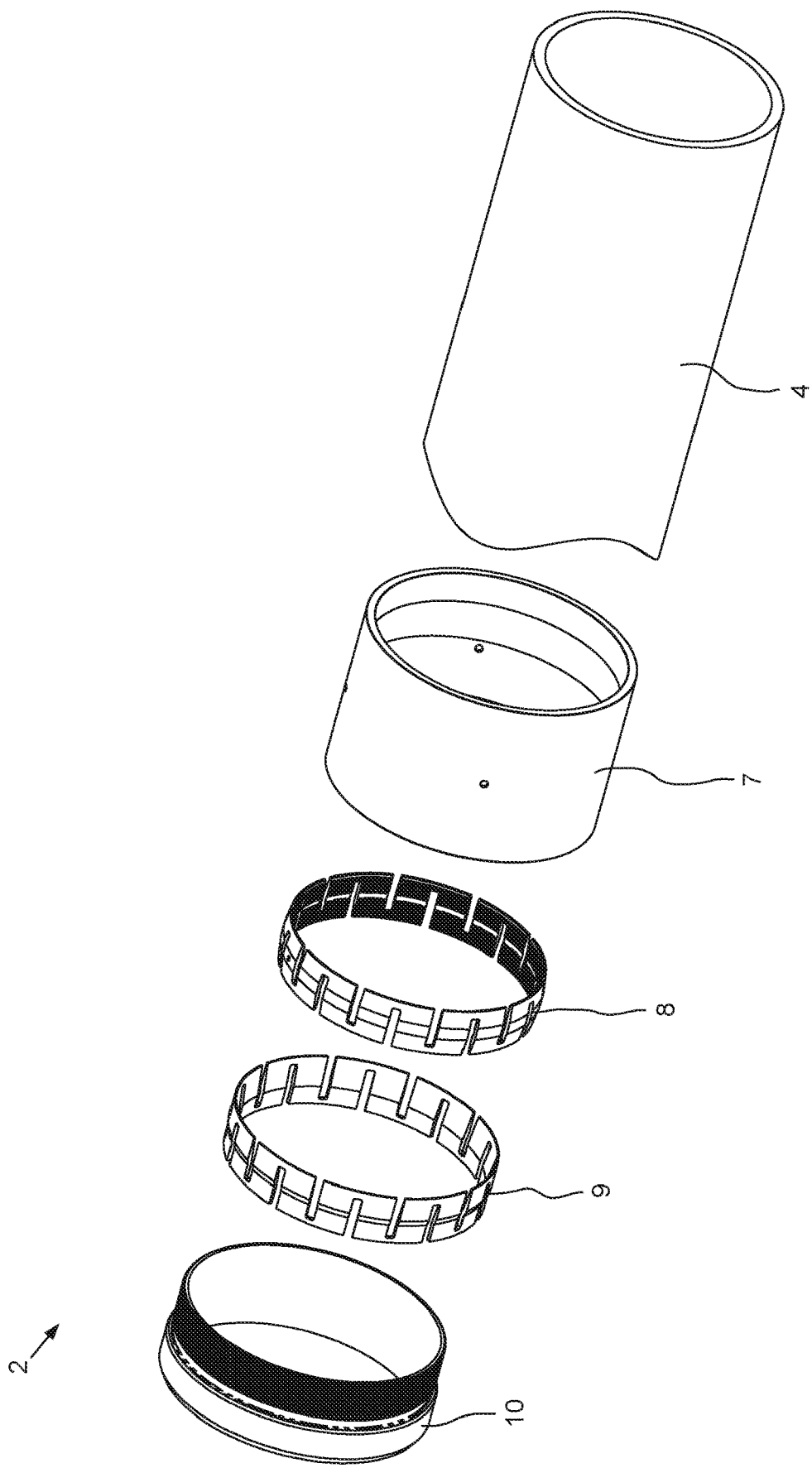

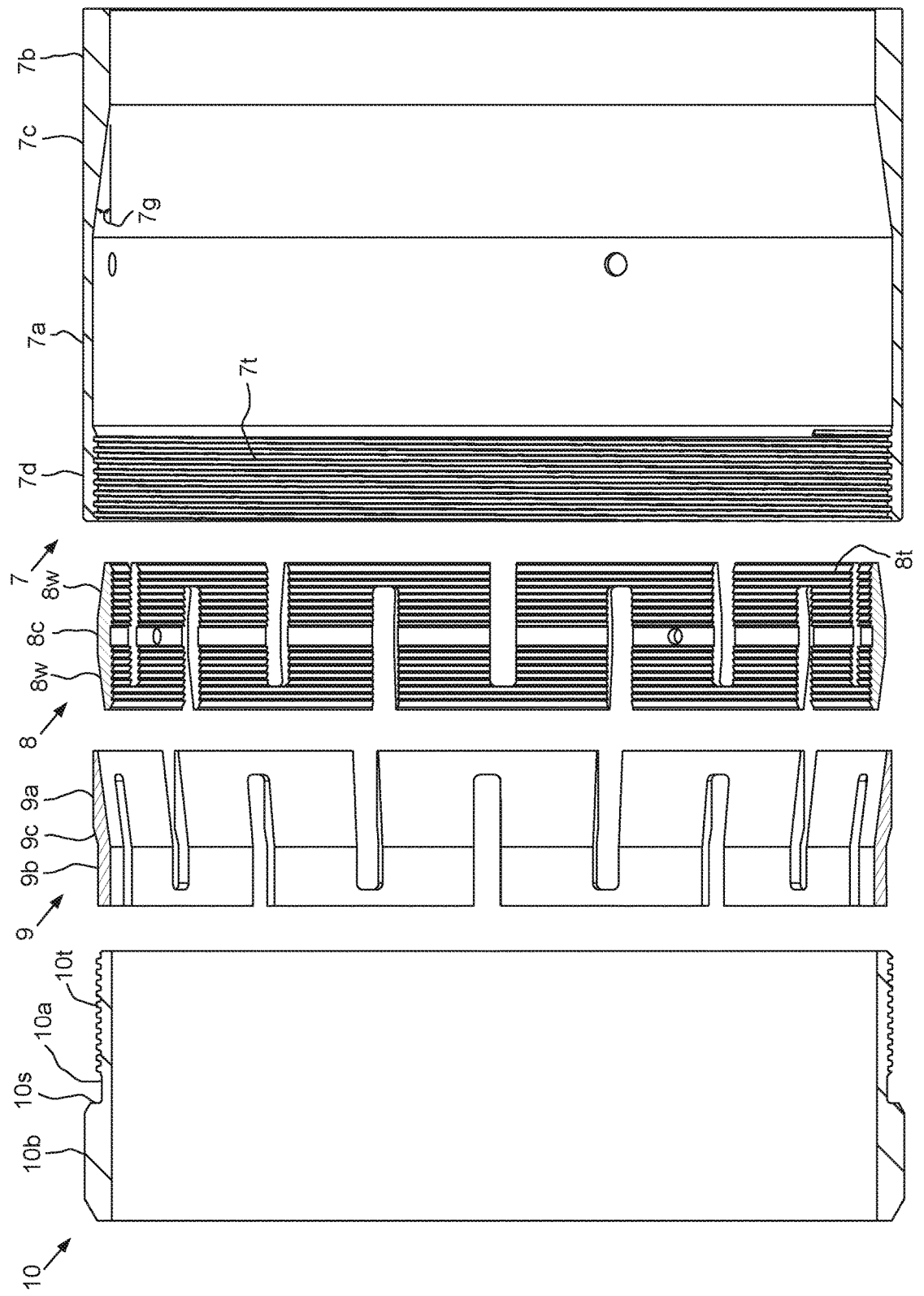

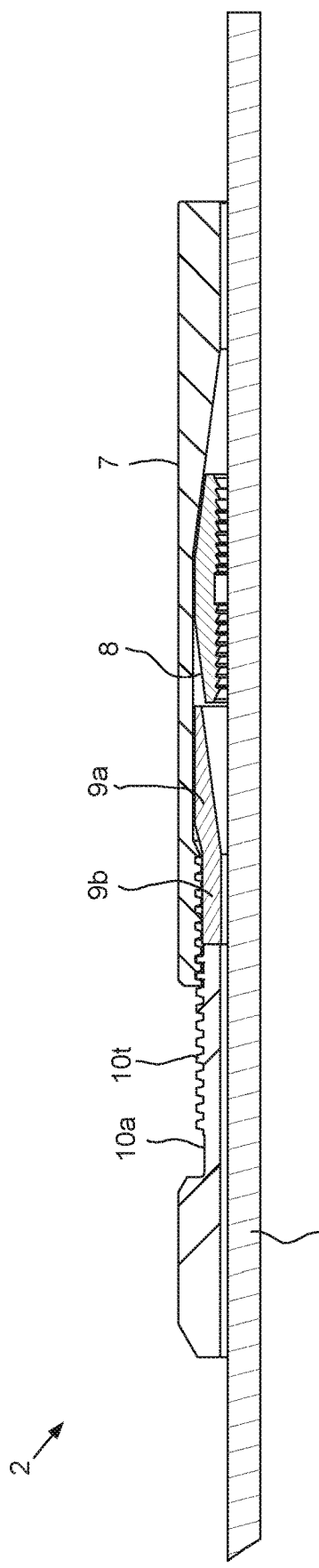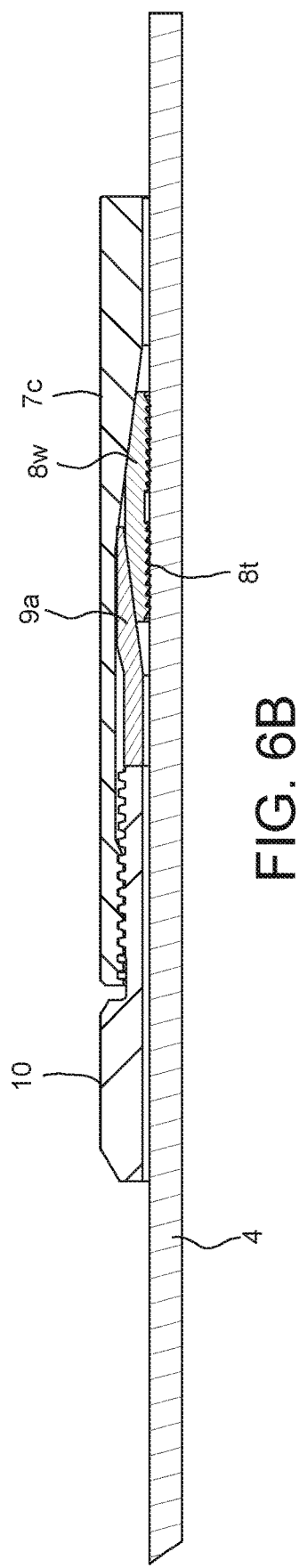
FIG. 6A
FIG. 6B

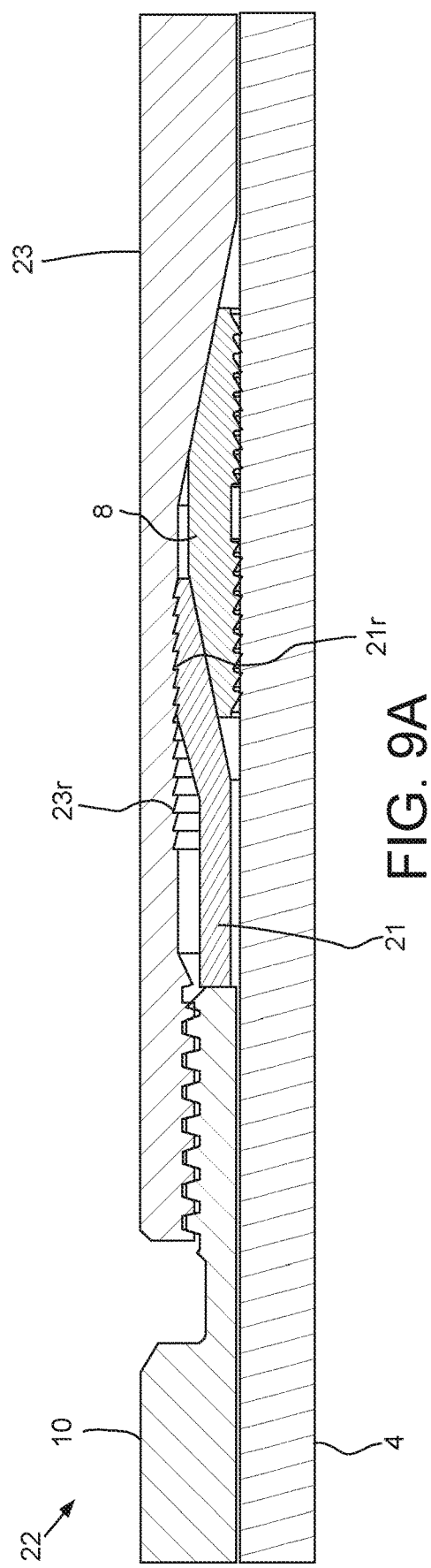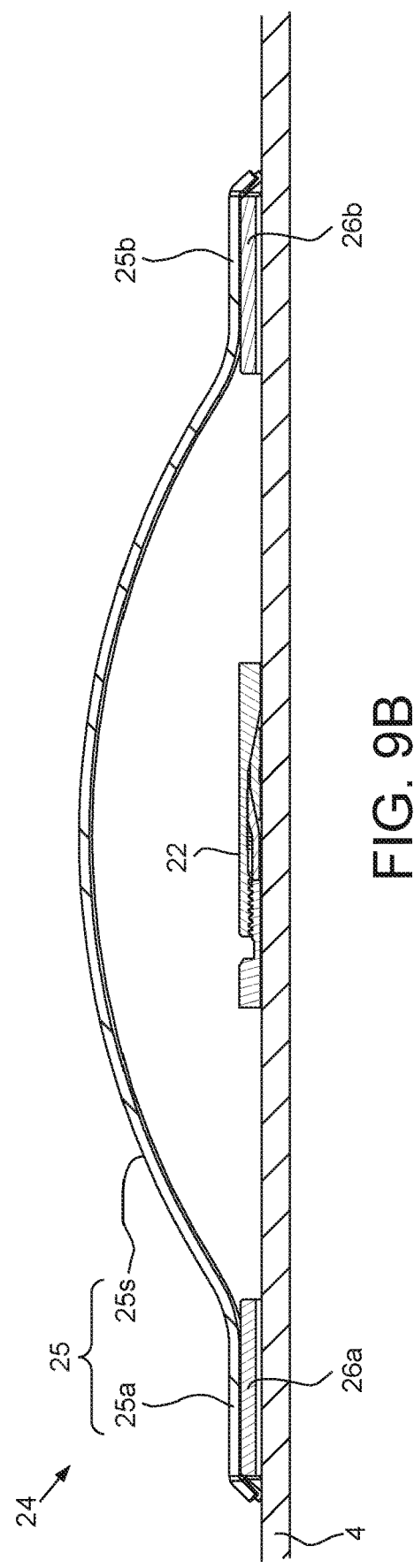

SLIMLINE STOP COLLAR

BACKGROUND OF THE DISCLOSURE

Field of the Disclosure

The present disclosure generally relates to a slimline stop collar.

Description of the Related Art

U.S. Pat. No. 4,384,626 discloses a clamp-on stabilizer that fixes the lateral position of a drill string in a borehole. The stabilizer includes a gripping sleeve with slotted and tapered ends, a stabilizer body receiving the sleeve, and a tubular locknut threaded into the body. The lower end of the stabilizer body is internally tapered to engage one tapered end of the gripping sleeve, while a ring abutting the locknut engages the other tapered end. The tapers may be different at each end of the sleeve to produce a sequential locking effect. A full-length longitudinal slot in the sleeve increases the tolerance range for objects to be clamped by the stabilizer.

U.S. Pat. No. 5,860,760 discloses a gripping device which has an inner member and an outer member. The inner member has a split which define a first end and a second end. A selectively operable device is also included to keep the first and second ends apart to permit the device to be placed around an object and to permit the first and second ends to move towards each other so that the inner member grips the object. At least part of an outer face of the inner member interfits with at least a part of an inner face of the outer member in a manner such that when a load is applied to the outer member, the inner face of the outer member acts upon the inner member to cause compression of the inner member thereby increasing the grip of the inner member on the object. The device is then locked in position on the object and when the load is removed the action of the outer member on the inner member is reduced thereby decreasing the grip of the inner member on the object and unlocking the device from the object.

U.S. Pat. No. 8,832,906 discloses a stop collar assembled using a method including the steps of receiving a bore of a base having a set of fingers extending along an exterior of a tubular, receiving a bore of a sleeve onto the tubular adjacent the set of fingers, and receiving the sleeve onto the set of fingers in an interference-fit. In alternate embodiments, the base comprises a plurality of angularly distributed fingers and/or the base comprises a gap to permit conformance of the base to the tubular. A fingerless base may cooperate with one or more separate fingers to form a base. In an embodiment of the method, the sleeve may be thermally expanded prior to the step of receiving the sleeve onto the set of fingers. The sleeve may be heated to expand the bore prior to being received onto the set of fingers.

U.S. Pat. No. 9,598,913 discloses a wear band including a rotating element having a bore receivable on a tubular, the bore including first and second bore portions slidably receiving first and second sleeve bearings. Outer surfaces of the sleeve bearings slidably engage the bore portions and the bores of the sleeve bearings slidably engage the tubular. A first stop collar and a second stop collar may be received on the tubular to together straddle the rotating element and sleeve bearings to longitudinally secure the rotating element in a position on the tubular. The tubular may be included within a tubular string run into a borehole or into the bore of an installed casing, such as in casing while drilling. The rotating element provides stand-off between a tubular and the wall of a bore, reduces frictional resistance to longitudinal sliding and also to rotation of the tubular string within the bore.

U.S. Pat. No. 9,963,942 discloses a centralizer including a centralizer body to be situated at the outer surface of a pipe string in the form of casing, liner, or the like used while drilling, the centralizer body being formed with a plurality of outer centralizer blades arranged in an inclined manner to the longitudinal axis thereof, wherein the centralizer body has an separate split inner tube secured to the pipe string by means of a press fit, and low friction inner surface of the centralizer body and separate center tube facing each other are made from low friction material U.S. Pat. No. 9,982,494 discloses an attachment device for an element made to be arranged on a downhole tubular body, in which an end portion of a sleeve, which is arranged to surround a portion of the tubular body, comprises an attachment portion. The attachment portion comprises at least one clamping element arranged for axial displacement by the abutment of an abutment surface against a conical abutment portion of a surrounding adapter sleeve.

US 2016/0376852 discloses a stabilizer assembly for a tubular member including a stabilizing body dimensioned to fit around the tubular member, a central portion having a radial projection, and a first end having a first threaded outer surface and a set of integral first elastic members. A first nut member includes a proximal end with a threaded inner surface configured to engage the first threaded outer surface of the stabilizing body and a central portion with a first tapered inner surface configured to engage the first elastic members of the stabilizing body. Threading the first nut member onto the first end of the stabilizing body forces the first elastic members to engage the first tapered inner surface of the first nut member thereby radially flexing the first elastic members to engage the tubular member. An inner surface of a distal end of each first elastic member may include a grip section.

SUMMARY OF THE DISCLOSURE

The present disclosure generally relates to a slimline stop collar. In one embodiment, a stop collar for mounting to a downhole tubular includes: a cylindrical housing having a threaded inner surface and a tapered inner surface; a compressible slip ring having teeth formed in an inner surface thereof and a pair of tapered outer surfaces; a compressible cam ring having a tapered inner surface; and a cylindrical bolt having a threaded outer surface. A natural outer diameter of each ring is greater than a minor diameter of the threaded surfaces. Screwing the threaded surfaces of the housing and the bolt is operable to drive the tapered surfaces together, thereby compressing the slip ring such that the teeth engage a periphery of the tubular.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 1A illustrates a centralizer equipped with a pair of the slimline stop collars, according to one embodiment of the present disclosure. FIG. 1B illustrates a body of the centralizer mounted to a downhole tubular.

FIGS. 2 and 3 illustrate a typical arrangement of the slimline stop collars.

FIGS. 4A, 4B, 5, 6A, and 6B illustrate assembly of the typical slimline stop collar.

FIG. 9A illustrates a fourth slimline stop collar having a third locking system, according to another embodiment of the present disclosure. FIG. 9B illustrates the fourth slimline stop collar being used with a resilient centralizer instead of the (rigid) centralizer.

DETAILED DESCRIPTION

Figure 4B:
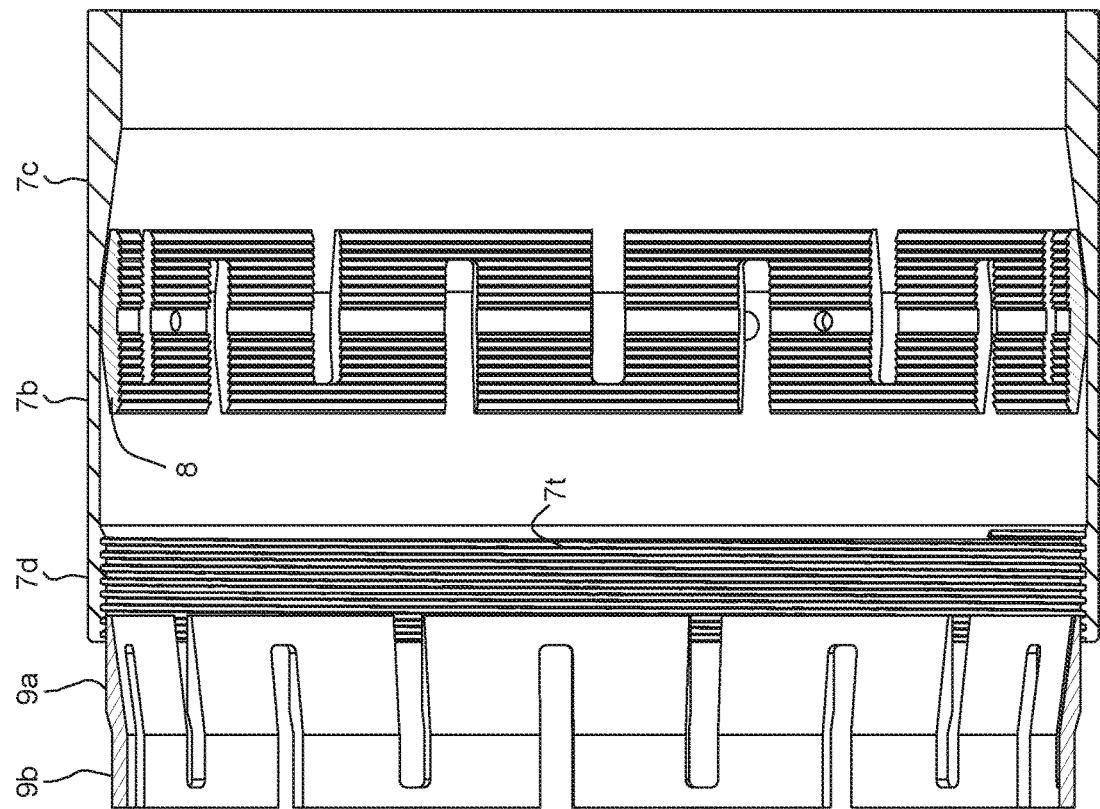

FIG. 1A illustrates a centralizer 1 equipped with a pair of the slimline stop collars 2a,b, according to one embodiment of the present disclosure. FIG. 1B illustrates a body 3 of the centralizer 1 mounted to a downhole tubular 4. The centralizer 1 may include the pair of slimline stop collars 2a,b, the body 3, a radial bearing 5, and a pair of thrust bearings 6a,b. Each stop collar 2a,b may be mounted to the downhole tubular 4, such as casing or liner, and the stop collars may straddle the centralizer 3, thereby trapping the centralizer onto the downhole tubular. The body 3 may be cylindrical and have a plurality (four shown) of blades 3b forming a periphery thereof and extending helically there-along. The radial bearing 5 may be a split tube made from one or more materials, such as an inner material and an outer material. The inner material of the radial bearing 5 may be a friction material and a natural inner diameter of the radial bearing may be less than an outer diameter of the downhole tubular 4, thereby forming an interference fit therewith. The outer material of the radial bearing 5 may be a low-friction material to facilitate rotation of the downhole tubular 4 relative to the body 3. An inner portion of the body 3 may also be coated with the low-friction material. Each thrust bearing 6a,b may be made from the low-friction material and may be disposed between the radial bearing 5 and a respective stop collar 2a,b or between the body 3 and the respective stop collar.

Alternatively, the radial bearing 5 may be a non-split tube. Alternatively, the radial bearing 5 may be made entirely from the low friction material.

A plurality of the centralizers 1 may each be mounted along a string of downhole tubulars 4, such as a casing or liner string, that will be drilled into a wellbore (not shown) adjacent to an unstable or depleted formation. The centralizers 1 may be spaced along the portion of the string of downhole tubulars 4 at regular intervals. Drilling the string of downhole tubulars 4 into the wellbore adjacent to the unstable or depleted formation is advantageous to using a drill string to prevent collapse or loss of drilling fluid due to the unstable or depleted formation. The string of downhole tubulars 4 may further include a casing bit screwed in at a bottom thereof and may be rotated by a top drive during drilling either directly or via a work string of drill pipe extending from the top of the string of downhole tubulars 4 to the top drive. During drilling, drilling fluid, such as mud, may be pumped down a bore of the string of downhole tubulars 4, may be discharged from the casing bit, and may return to surface via an annulus formed between the string of downhole tubulars 4 and the wellbore. The string of downhole tubulars 4 may have premium connections to withstand drilling torque exerted thereon by the top drive. The string of downhole tubulars 4 may further include a float collar located adjacent to the casing bit and a deployment assembly located at an upper end thereof including a hanger, a packer, and one or more wiper plugs. Once the string of downhole tubulars 4 has been drilled into place, the hanger may be set, cement slurry may be pumped into the annulus, and the packer set, thereby installing the string of downhole tubulars into the wellbore. The casing bit may then be drilled through to facilitate further drilling of the wellbore to a hydrocarbon bearing formation, such as crude oil and/or natural gas.

FIGS. 2 and 3 illustrate a typical arrangement 2 of the slimline stop collars 2a,b. The typical stop collar 2 may include a housing 7, a slip ring 8, a cam ring 9, and a bolt 10. Each of the components 7-10 may be made from a metal or alloy, such as steel. The housing 7 may be cylindrical and have a first portion 7a with an enlarged inner diameter for receiving the slip ring 8 and the cam ring 9, a second portion 7b with a reduced inner diameter for engagement with one of the thrust bearings 6a,b, a third portion 7c with a tapered inner surface connecting the first and second portions, and a fourth portion 7d having a threaded 7t inner surface and extending from an end of the housing to the first portion. The housing 7 may also have a plurality of holes formed through a wall of the first portion 7a for facilitating assembly (discussed below). The inner thread 7t of the fourth portion 7d may be for mating with a threaded surface 10t of the bolt 10. The forms of the threads 7t, 10t may be lead screws for driving engagement of the slip ring 8 with a periphery of the downhole tubular 4. The taper angle 7g relative to an axis parallel to a longitudinal axis of the downhole tubular 4 may range between five and twenty-five degrees.

The slip ring 8 may have a central portion 8c with a constant diameter outer surface and a pair of working portions 8w, each working portion having a tapered outer surface declining away from the central portion. The taper of each working portion 8w may correspond to the taper of the third portion 7c of the housing 7. The central portion 8c may have a plurality of holes or threaded sockets formed therethrough for facilitating assembly (discussed below). An inner surface of each working portion 8w may have a plurality of circumferential teeth 8t (aka wickers) formed therein. Each tooth 8t may have a cross sectional shape resembling a right triangle and the hypotenuses of the teeth of each working portion 8w may incline toward the central portion, thereby providing bidirectional gripping of the downhole tubular 4. The slip ring 8 may be partially split by a plurality of slots extending radially through a wall thereof, each slot extending from one end of the slip ring, along the respective working portion 8w and the center portion 8c, and terminating in the other working portion before reaching the other end of the slip ring. The slots may alternate between the ends of the slip ring 8. Due to the slots, the slip ring 8 may be compressible between a natural position (shown) and a compressed position (FIG. 6B). In the natural position, an outer diameter of the central portion 8c may be greater than a minor diameter of the threads 7t, 10t.

Alternatively, the slip ring 8 may have a single through-slot instead of being partially split. Alternatively, the teeth 8t of the slip ring 8 may all be inclined in the same direction, thereby providing only monodirectional gripping of the downhole tubular 4 and the slip ring may have an orientation indicator, such as an arrow, on a periphery thereof, such as by adhering, engraving, or painting. Alternatively, the teeth 8t of the slip ring may all be inclined away from the central portion.

The cam ring 9 may have a first portion 9a with a tapered inner surface and an enlarged outer diameter for engagement with one of the working portions 8w of the slip ring 8, a second portion 9b with a reduced outer diameter for engagement with an end of the bolt 10, and a third portion 9c with tapered inner and outer surfaces connecting the first and second portions. The taper of the first portion 9a may correspond to the taper of the working portions 8w of the slip ring 8. The cam ring 9 may be partially split by a plurality of slots extending radially through a wall thereof, each slot extending from one end of the cam ring, along either one of the first portion 9a or the second portion 9b and the transition portion 9c, and terminating in the other one of the first portion 9a or the second portion 9b before reaching the other end of the cam ring. The slots may alternate between the ends of the cam ring 9. Due to the slots, the cam ring 9 may be compressible between a natural position (shown) and a compressed position (FIG. 4B). In the natural position, an outer diameter of the first portion 9a may be greater than a minor diameter of the threads 7t, 10t.

Alternatively, the cam ring 9 may have a single through-slot instead of being partially split.

The bolt 10 may be cylindrical and have a first portion 10a with a reduced outer diameter and the thread 10t formed in an outer surface thereof and extending from an end thereof, a second portion 10b with an enlarged outer diameter for engagement with a pipe wrench (not shown), and a shoulder 10s connecting the first and second portions. The minor diameter of the threads 7t, 10t may be less than the inner diameter of the first portion 7a of the housing 7.

Figure 4A:
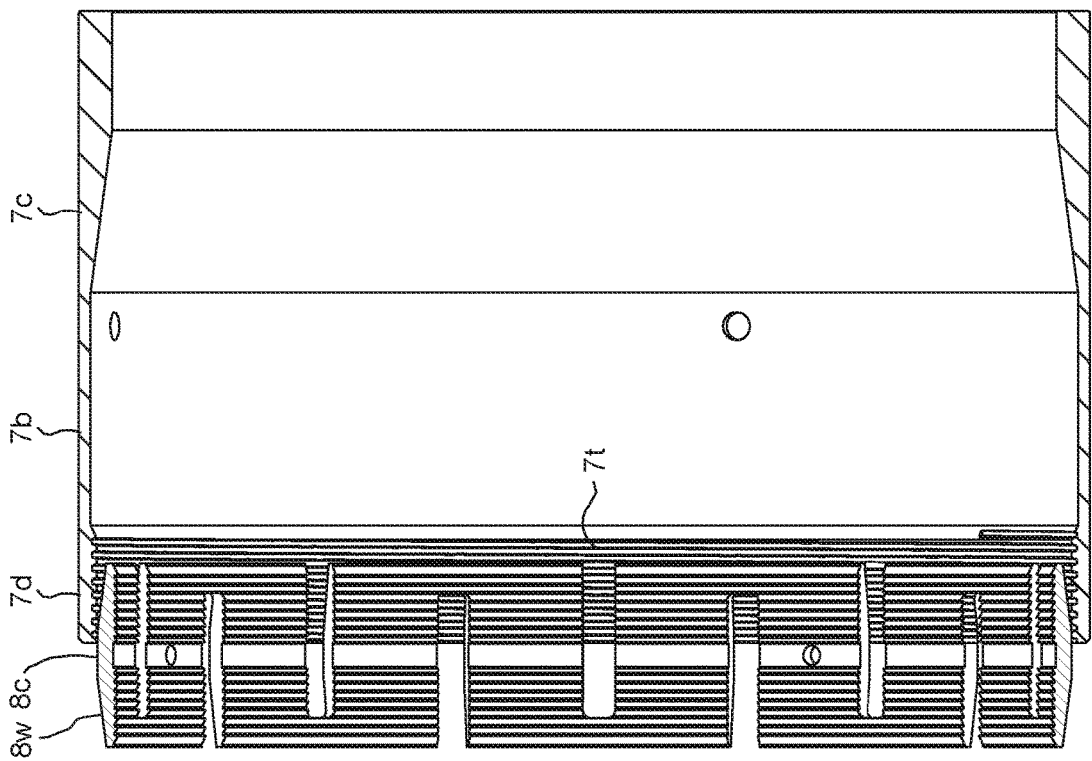

FIGS. 4A, 4B, 5, 6A, and 6B illustrate assembly of the typical slimline stop collar 2. Referring specifically to FIG. 4A, to begin assembly, the slip ring 8 may be compressed so that the outer diameter of the central portion 8c is less than or equal to the minor diameter of the thread 7t of the fourth portion 7d of the housing 7. The compressed slip ring 8 may then be inserted through the thread 7t of the fourth portion 7d and along the bore of the first portion 7a of the housing 7 until a distal one of the working portions 8w enters the bore of the third portion 7c. This placement may allow sufficient room remaining in the first portion 7a for receiving the first portion 9a of the cam ring 9. The compressed slip ring 8 may then be allowed to return to the natural position. In the natural position, the outer diameter of the central portion 8c may correspond to the inner diameter of the first portion 7a of the housing 7. The holes in the slip ring 8 may be aligned with the holes in the housing 7 and fasteners 34 (see FIG. 11) may be inserted therethrough, thereby securing the slip ring to the housing and ensuring that the slip ring does not catch the periphery of the downhole tubular 4 as the loosely fitted assembly 2 is slid over the downhole tubular.

Referring specifically to FIG. 4B, the cam ring 9 may be compressed so that the outer diameter of the first portion 9a is less than or equal to the minor diameter of the thread 7t of the fourth portion 7d of the housing 7. The first portion 9a of the compressed cam ring 9 may then be inserted through the thread 7t and into the bore of the first portion 7a of the housing 7. Once the first portion 9a of the cam ring 9 has cleared the thread 7t, the cam ring 9 may be released and allowed to return to the natural position. In the natural position, the outer diameter of the first portion 9a of the cam ring 9 may correspond to the inner diameter of the first portion 7a of the housing 7 and the outer diameter of the second portion 9b thereof may correspond to the minor diameter of the thread 7t.

Figure 5:
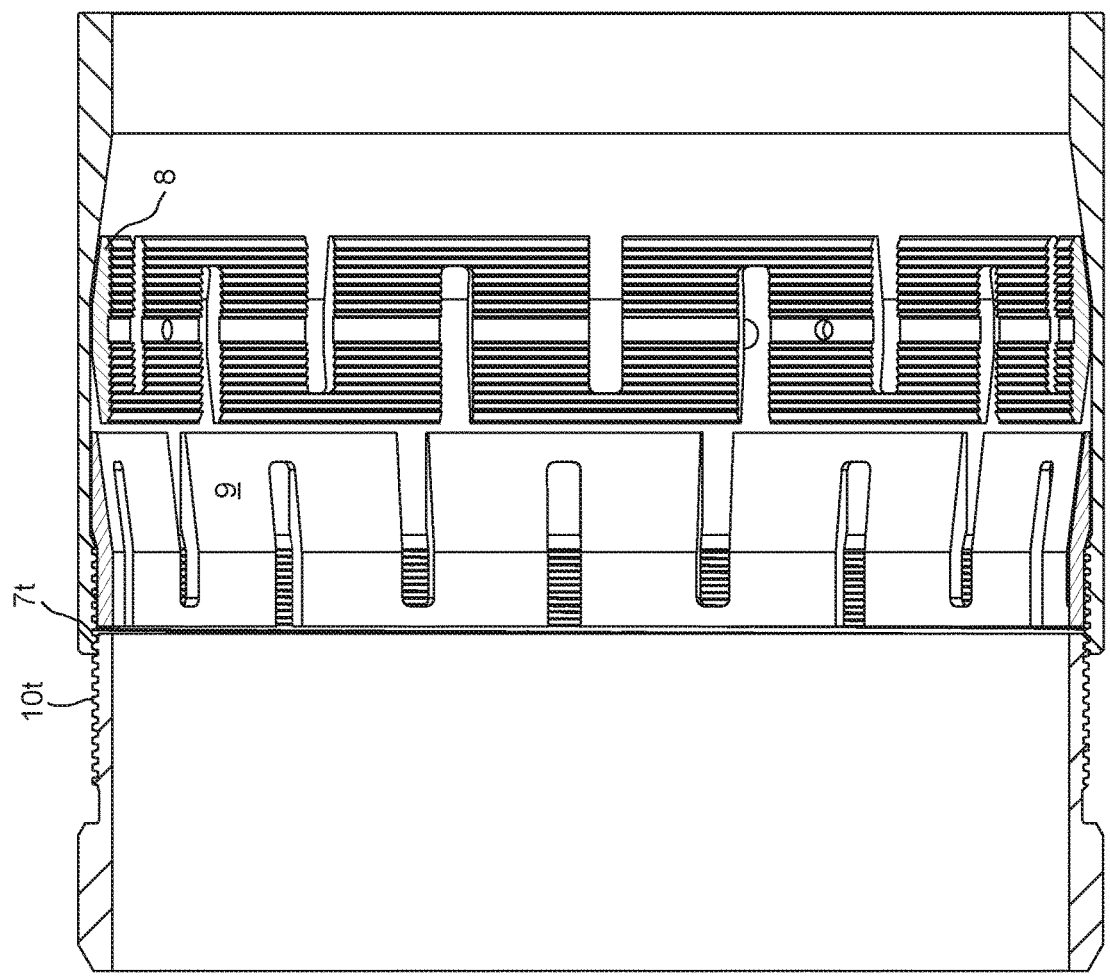

Referring specifically to FIG. 5, the thread 10t of the bolt 10 may be engaged with the housing thread 7t. Referring specifically to FIG. 6A, the loosely fitted stop collar 2 may then be slid over the downhole tubular 4 until the end of the second portion 7b of the housing 7 engages one of the thrust bearings 6a,b. The fasteners 34 may then be removed from the housing 7 and the slip ring 8. The housing 7 may be engaged with a first pipe wrench. A second pipe wrench may then be engaged with the second portion 10b of the bolt 10 and the bolt may be rotated relative to the housing 7 in a tightening direction, thereby advancing the bolt toward the housing. During continued rotation of the bolt 10 relative to the housing 7, an end of the first portion 10a of the bolt may engage an end of the second portion 9b of the cam ring 9 and drive the cam ring toward the slip ring 8.

Alternatively, the thread 10t of the bolt 10 may be engaged with the housing thread 7t after sliding over the downhole tubular 4.

Referring specifically to FIG. 6B, during continued rotation of the bolt 10 relative to the housing 7, the first portion 9a of the cam ring 9 may slide over the adjacent working portion 8w of the slip ring 8 until the mating tapered surfaces thereof engage, thereby driving the distal end surface thereof into engagement with the mating tapered surface of the third portion 7c of the housing. During continued rotation of the bolt 10 relative to the housing 7, the first portion 9a of the cam ring 9 may continue to slide over the adjacent working portion 8w of the slip ring 8 and advancement of the slip ring along the tapered inner surface of the third portion 7c of the housing may continue, thereby radially compressing the slip ring 8 toward the periphery of the downhole tubular 4. Radial compression of the slip ring 8 may continue until the teeth 8t thereof engage and penetrate the periphery of the downhole tubular 4, thereby longitudinally and torsionally mounting the stop collar 2 to the downhole tubular.

Alternatively, the stop collar 2 may be installed on the downhole tubular 4 with the bolt 10 located adjacent to one of the thrust bearings 6a,b instead of the housing 7 located adjacent thereto.

Figure 7A:
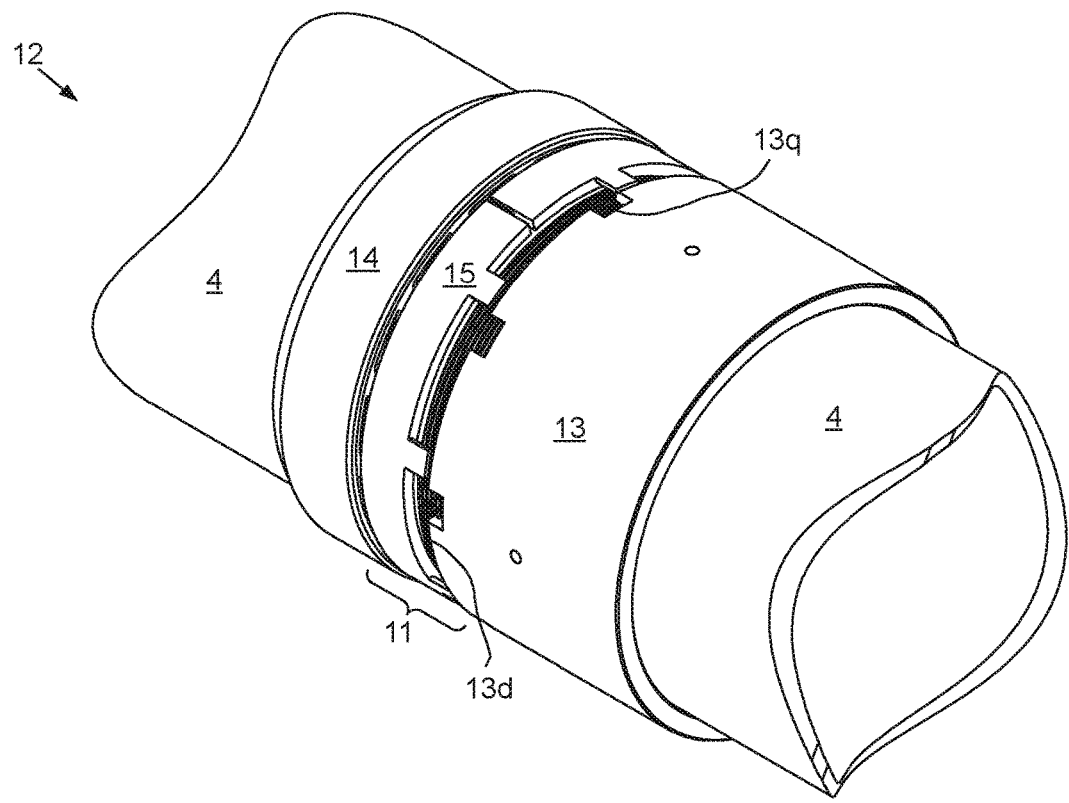
FIGS. 7A-7C illustrate a second slimline stop collar having a locking system, according to another embodiment of the present disclosure.
Figures 7B, 7C:
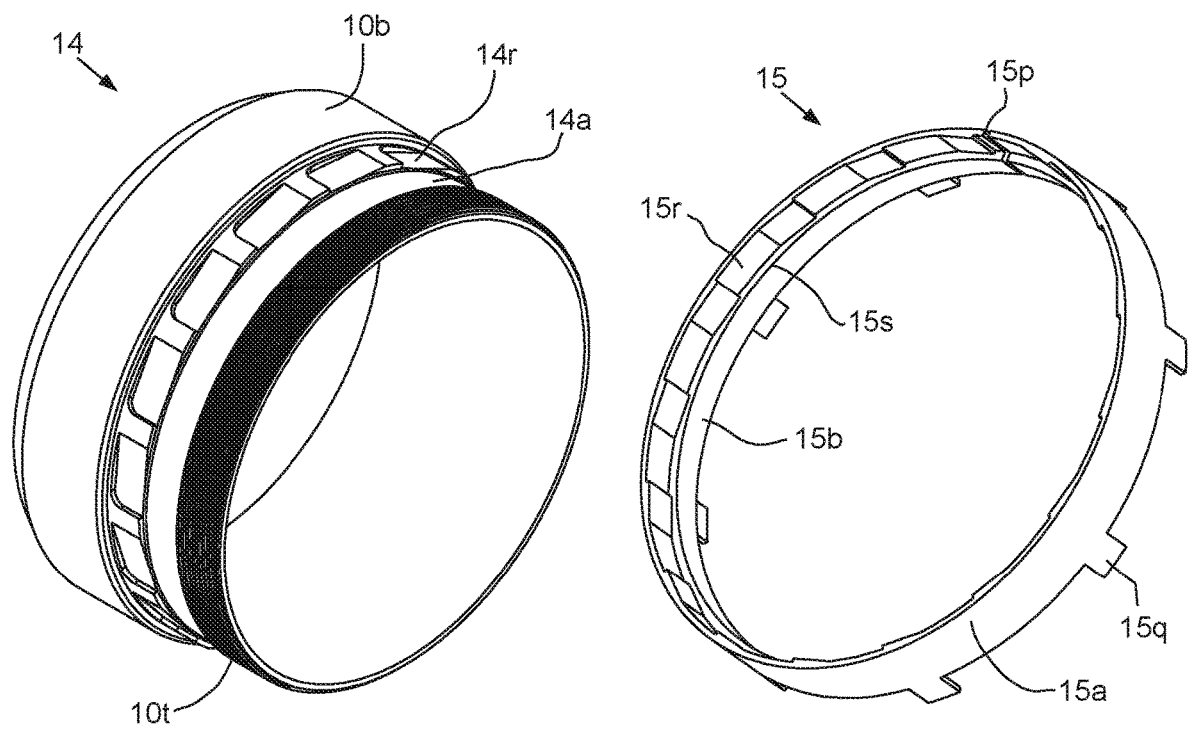

FIGS. 7A-7C illustrate a second slimline stop collar 12 having a locking system 11, according to another embodiment of the present disclosure. The second slimline stop collar 12 may include the locking system 11, a second housing 13, the slip ring 8, the cam ring 9, and a second bolt 14. The locking system 11 may include a lock ring 15, a ratchet profile 14r of the second bolt 14, and a torque profile 13q of the second housing 13.

The second bolt 14 may be cylindrical and have an extended first portion 14a with a reduced outer diameter and the thread 10t formed on an outer surface thereof, the second portion 10b with an enlarged outer diameter for engagement with a pipe wrench (not shown), and the ratchet profile 14r connecting the first and second portions. The ratchet profile 14r may include a series of circumferentially extending ramps and arcuate straights formed in an outer surface of the second bolt 14. Each ramp of the ratchet profile 14r may be straddled by a pair of adjacent arcuate straights.

The lock ring 15 may have a single split 15p therein for facilitating ratcheting interaction with the ratchet profile 14r of the second bolt 14, a first portion 15a with a ratchet profile 15r formed in an inner surface thereof, a second portion 15b with a reduced inner diameter relative to a minimum inner diameter of the first portion, a shoulder 15s connecting the first and second portions, and a torque profile 15q formed in an end of the second portion. The ratchet profile 15r may be similar to the ratchet profile 14r of the second bolt 14 for mating therewith. The torque profile 15q may include a series of circumferentially spaced rectangular keys.

The second housing 13 may be cylindrical and have the first portion 7a with an enlarged inner diameter for receiving the slip ring 8 and the cam ring 9, the second portion 7b with a reduced inner diameter for engagement with one of the thrust bearings 6a,b, the third portion 7c with the tapered inner surface connecting the first and second portions, and an extended fourth portion 13d having the threaded 7t inner surface, extending from an end of the housing to the first portion, and having the torque profile 13q formed in the end thereof. The inner surface of the torque profile 13q may be non-threaded. The torque profile 13q may include a series of circumferentially spaced rectangular keyways for receiving the keys of the torque profile 15q of the lock ring 15.

Assembly of the second stop collar 12 may be similar to that of the stop collar 2 except that before the second bolt 14 is engaged with the second housing 13, the lock ring 15 may be slid over the first portion 14a of the second bolt while aligning and engaging the ratchet profiles 14r, 15r thereof and until the shoulder 15s of the lock ring engages an end of the ratchet profile of the second bolt 14. The ratchet profiles 14r, 15r may be configured such that the rotation is allowed in the tightening direction of rotation of the second bolt 14 relative to the second housing 13 but prevented in the loosening direction thereof. As the second bolt 14 is being screwed into the second housing 13, rotation may be halted and the lock ring 15 rotated to align and partially engage the torque profiles 13q, 15q. Rotation of the second bolt 14 relative to the second housing 13 may then be resumed until the slip ring 8 has engaged the downhole tubular 4. Since the lock ring 15 is now engaged with the ratchet profile 14r and the torque profile 13q, the locking system 11 prevents unscrewing of the threaded connection 7t, 10t between the second housing 13 and bolt 14.

Additionally, there may be some back-lash during and/or after assembly of the second stop collar 12. However, this back-lash may be accommodated by ensuring that the slip ring, cam ring 9, and/or second housing 13 have sufficient resilience when engaged with each other.

Figure 8A:
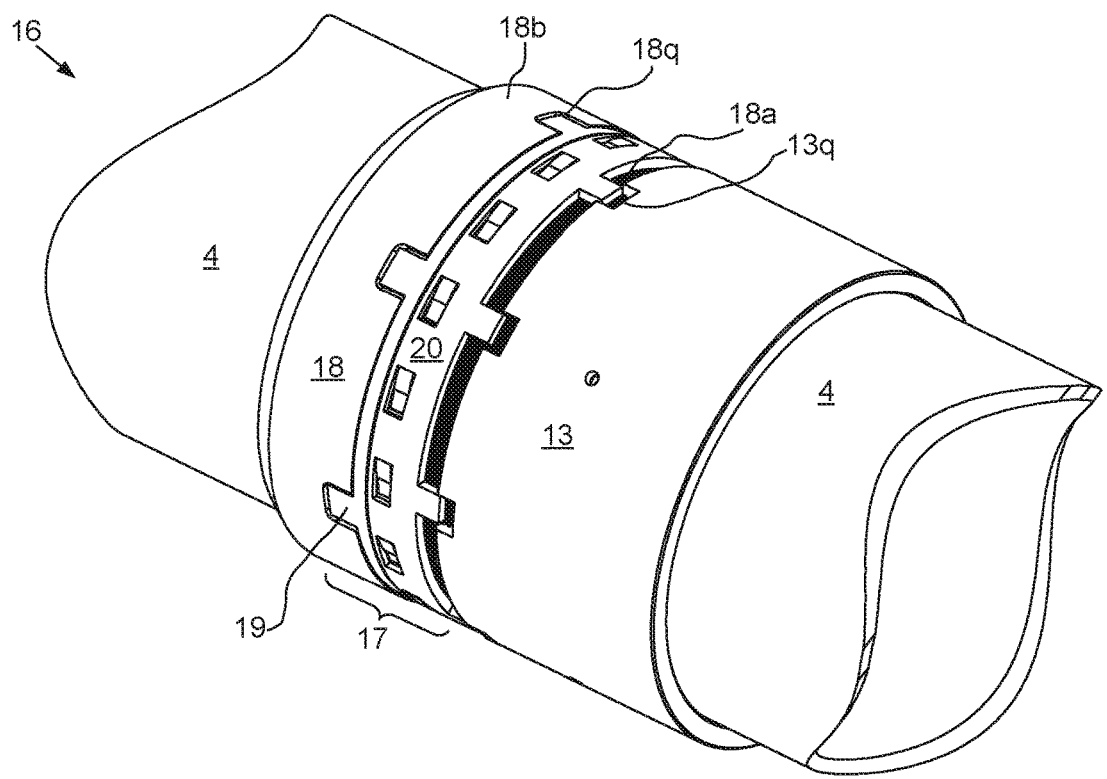
FIGS. 8A-8C illustrate a third slimline stop collar having a second locking system, according to another embodiment of the present disclosure.
Figure 8B:
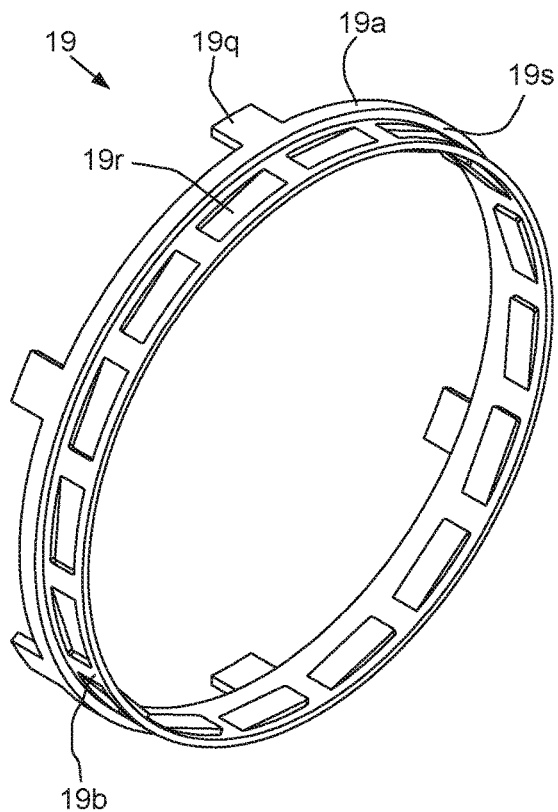
Figure 8C:
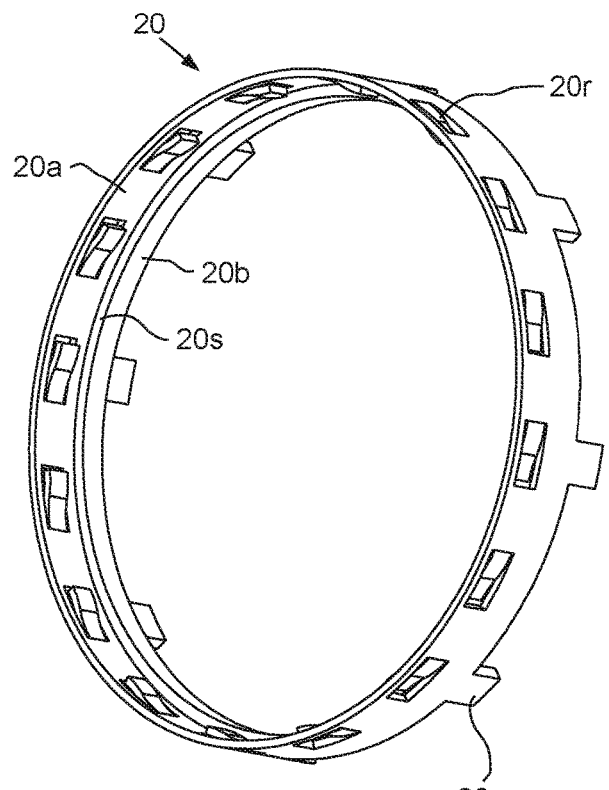

FIGS. 8A-8C illustrate a third slimline stop collar 16 having a second locking system 17, according to another embodiment of the present disclosure. The third slimline stop collar 16 may include the second locking system 17, the second housing 13, the slip ring 8, the cam ring 9, and a third bolt 18. The second locking system 17 may include an inner lock ring 19, an outer lock ring 20, a torque profile 18q of the third bolt 18, and the torque profile 13q of the second housing 13.

The third bolt 18 may be cylindrical and have an extended first portion 18a with a reduced outer diameter and the thread 10t formed on an outer surface thereof, a second portion 18b with an enlarged outer diameter for engagement with a pipe wrench (not shown), a shoulder connecting the first and second portions, and the torque profile 18q formed in an end of the second portion. The torque profile 18q may include a series of circumferentially spaced rectangular keyways.

The inner lock ring 19 may have a first portion 19a with an enlarged outer diameter, the torque profile 19q formed in an end of the first portion, a second portion 19b with a reduced outer diameter, a ratchet profile 19r formed in an outer surface of the second portion and extending through a wall thereof to the inner surface thereof, and a shoulder 19s connecting the first and second portions. The ratchet profile 19r may include a series of circumferentially extending ramps and arcuate straights formed in an outer surface second portion 19b. Each ramp of the ratchet profile 19r may be straddled by a pair of adjacent arcuate straights. The torque profile 19q may include a series of circumferentially spaced rectangular keys for engaging the keyways of the torque profile 18q of the third bolt 18.

The outer lock ring 20 may have a first portion 20a with a ratchet profile 20r formed in wall thereof, a second portion 15b having a reduced inner diameter relative to that of the first portion, a shoulder 20s connecting the first and second portions, and a torque profile 20q formed in an end of the second portion. The ratchet profile 20r may include a series of circumferentially extending slots and cantilevered tabs disposed in the slots. Each tab may extend from one side of the respective slot and may bend radially inward as the tab extends thereacross. A free portion of the tab may protrude inwardly from the respective slot. The torque profile 20q may include a series of circumferentially spaced rectangular keys for engaging the keyways of the torque profile 13q of the second housing 13.

Alternatively, the outer lock ring 20 may have a single split to facilitate manufacture thereof. Alternatively, the second stop collar 12 may include an inner lock ring having the ratchet profile 14r formed thereon and including the third bolt 18 instead of the second bolt 14.

Assembly of the third stop collar 16 may be similar to that of the stop collar 2 except that before the third bolt 18 is engaged with the second housing 13, the inner lock ring 19 may be slid over the first portion 18a of the third bolt while aligning and engaging the torque profiles 18q, 19q thereof. The outer lock ring 20 may then be slid over the inner lock ring 19 while aligning and engaging the ratchet profiles 19r, 20r thereof. The ratchet profiles 19r, 20r may be configured such that the rotation is allowed in the tightening direction of rotation of the third bolt 18 relative to the second housing 13 but prevented in the loosening direction thereof. As the third bolt 18 is being screwed into the second housing 13, rotation may be halted and the lock rings 19, 20 rotated to align and partially engage the torque profiles 13q, 20q while keeping the torque profiles 18q, 19q at least partially engaged. Rotation of the third bolt 18 relative to the second housing 13 may then be resumed until the slip ring 8 has engaged the downhole tubular 4. Since the lock rings 19, 20 are now engaged with the torque profiles 13q, 18q and each other, the second locking system 17 prevents unscrewing of the threaded connection 7t, 10t between the second housing 13 and the third bolt 18.

FIG. 9A illustrates a fourth slimline stop collar 22 having a third locking system 21r, 23r, according to another embodiment of the present disclosure. The fourth slimline stop collar 22 may include the third locking system 21r, 23r, a third housing 23, the slip ring 8, a second cam ring 21, and the bolt 10. The third locking system 21r, 23r may include a ratchet profile 21r of the second cam ring 21, and a ratchet profile 23r of the third housing 23. The second cam ring 21 may be similar to the cam ring 9 except for having the ratchet profile 21r formed in an outer surface of the first portion thereof. The third housing 23 may be similar to the housing 7 except for having the ratchet profile 23r formed in an inner surface of the first portion thereof. Instead of preventing unscrewing of the threaded connection 7t, 10t, the third locking system 21r, 23r prevents backward movement of the second cam ring 21 away from the slip ring 8.

FIG. 9B illustrates the fourth slimline stop collar 22 being used with a resilient centralizer 24 instead of the (rigid) centralizer 1. The resilient centralizer 24 may include a pair of collars 26a,b, a body 25, and the fourth slimline stop collar 22. The body 25 may have a pair of end rings 25a,b and a plurality of bow springs 25s extending therebetween. The bow springs 25s may be spaced around the body 25 at regular intervals, such as eight bow springs spaced at forty-five degree intervals. Bypass passages may be formed between the bow springs 25s to accommodate fluid flow through an annulus formed between the downhole tubular 4 and the wellbore. The bow springs 25s may each be identical and radially movable between an expanded position (shown) and a retracted position (not shown). The bow springs 25s may have a parabolic shape in the expanded position.

The body 25 may longitudinally extend when moving from the expanded position to the retracted position and longitudinally contract when moving from the retracted position to the expanded position. The bow springs 25s may be naturally biased toward the expanded position and an expanded diameter of the centralizer 24 may correspond to a diameter of the wellbore. Engagement of the bow springs 25s with a wall of the wellbore may move the downhole tubular 4 toward a central position within the wellbore to ensure that a uniform cement sheath is formed around the downhole tubular during the cementing operation. The body 25 may be formed from a single sheet of spring steel by cutting out slots to form strips which will become the bow springs 25s. The body 25 may be formed into a tubular shape by rolling the cut sheet and welding seams of the end rings 25a,b together. The bow springs 25s may have the natural bias toward the expanded position by being held therein during heat treatment of the body 25.

After the body 25 has been formed, each collar 26a,b may be inserted into the respective end rings 25a,b. Each collar 26a,b may be formed to be a tight fit within the end rings 25a,b. Each collar 26a,b may then be spot-welded to the respective end rings 25a,b. A lip of each end ring 25a,b extending past the respective collar 26a,b may be split into a multitude of tabs (before or after insertion of the collars) and the tabs may be bent over the respective collar, thereby mounting the collars to the body 25 (in addition to the spot welds). The stop collar 22 may be located between the collars 26a,b by insertion through one of the slots between the bow springs 25s before the centralizer 24 is slid over the periphery of the downhole tubular 4. Setting of the stop collar 22 may trap the centralizer 24 into place along the downhole tubular 4 while allowing limited longitudinal movement of the body 5 relative thereto to accommodate movement between the positions.

Alternatively, any of the other slimline stop collars 2, 12, 16, 27, 31, 32 may be used with the resilient centralizer instead of the fourth slimline stop collar 22. Alternatively, the centralizer 24 may include a pair of slimline stop collars 22 straddling the end rings 25a,b instead of the single stop collar located therebetween.

Figure 10:
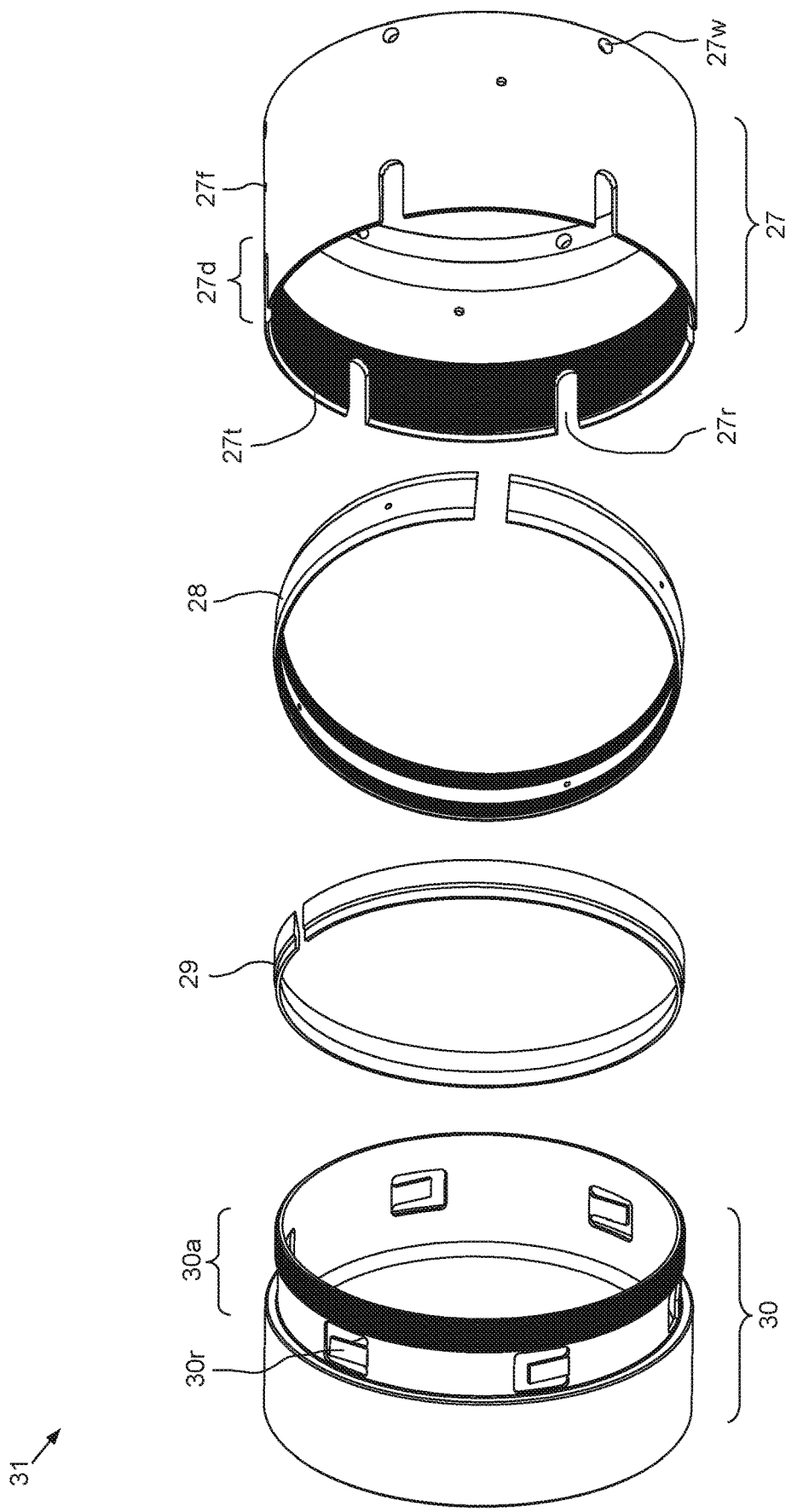
FIG. 10 illustrates a fifth slimline stop collar having a fourth locking system, according to another embodiment of the present disclosure.

FIG. 10 illustrates a fifth slimline stop collar 31 having a fourth locking system 27r, 30r, according to another embodiment of the present disclosure. The fifth slimline stop collar 31 may include the fourth locking system 27r, 30r, a fourth housing 27, a second slip ring 28, a third cam ring 29, and a fourth bolt 30. The second locking system 27r, 30r may include a ratchet profile 27r of the fourth housing 27 and a ratchet profile 30r of the fourth bolt 30.

The fourth housing 27 may be cylindrical and have the first portion 7a with an enlarged inner diameter for receiving the second slip ring 28 and the third cam ring 29, the second portion 7b with a reduced inner diameter for engagement with one of the thrust bearings 6a,b, the third portion 7c with the tapered inner surface connecting the first and second portions, and an extended fourth portion 27d having a threaded 27t inner surface partially split by the ratchet profile 27r, extending from an end of the housing to the first portion, and having the ratchet profile extending from the end thereof. The ratchet profile 27r may include a series of circumferentially spaced and longitudinally extending catches, such as slots, for receiving the tabs of the ratchet profile 30r of the fourth bolt 30. The fourth housing 27 may also have a first plurality of holes 27f formed through a wall of the first portion 7a for facilitating assembly (discussed below) and a second plurality of holes 27w formed through a wall of the second portion 7b for facilitating assembly (discussed below).

Alternatively, the ratchet profile 27r may be formed at an unthreaded portion of the fourth housing 27.

The second slip ring 28 may be similar to the (first) slip ring 8 except for having a single through-slot instead of being partially split. The third cam ring 29 may be similar to the (first) cam ring 9 except for having a single through-slot instead of being partially split.

The fourth bolt 30 may be cylindrical and have an extended first portion 30a with a reduced outer diameter and the thread 10t formed on an outer surface thereof, the second portion 10b with an enlarged outer diameter for engagement with a pipe wrench (not shown), the ratchet profile 30r formed in the extended first portion, and the shoulder 10s connecting the first and second portions. The ratchet profile 30r may include a circumferential row of openings and cantilevered tabs disposed in the openings and extending radially outward as the tabs extend circumferentially thereacross. The ratchet profile 30r may be located adjacent to the thread 10t and between the thread and the shoulder 10s. The ratchet profiles 27r, 30r may be configured such that the rotation is allowed in the tightening direction of rotation of the fourth bolt 30 relative to the fourth housing 27 but prevented in the loosening direction thereof. This is due to free ends of the tabs having a natural diameter greater than a major diameter of the threaded surface 27t to ensure that the tabs engage the slots of the ratchet profile 27r.

FIGS. 11-14 illustrates a sixth slimline stop collar 32 having the fourth locking system 27r, 30r, according to another embodiment of the present disclosure. The sixth slimline stop collar 32 may include the fourth locking system 27r, 30r, the fourth housing 27, the second slip ring 28, the third cam ring 29, and a fifth bolt 33. The fifth bolt 33 may be similar to the fourth bolt 30 except for omission of the second portion 10b and the shoulder 10s.

Figure 11:
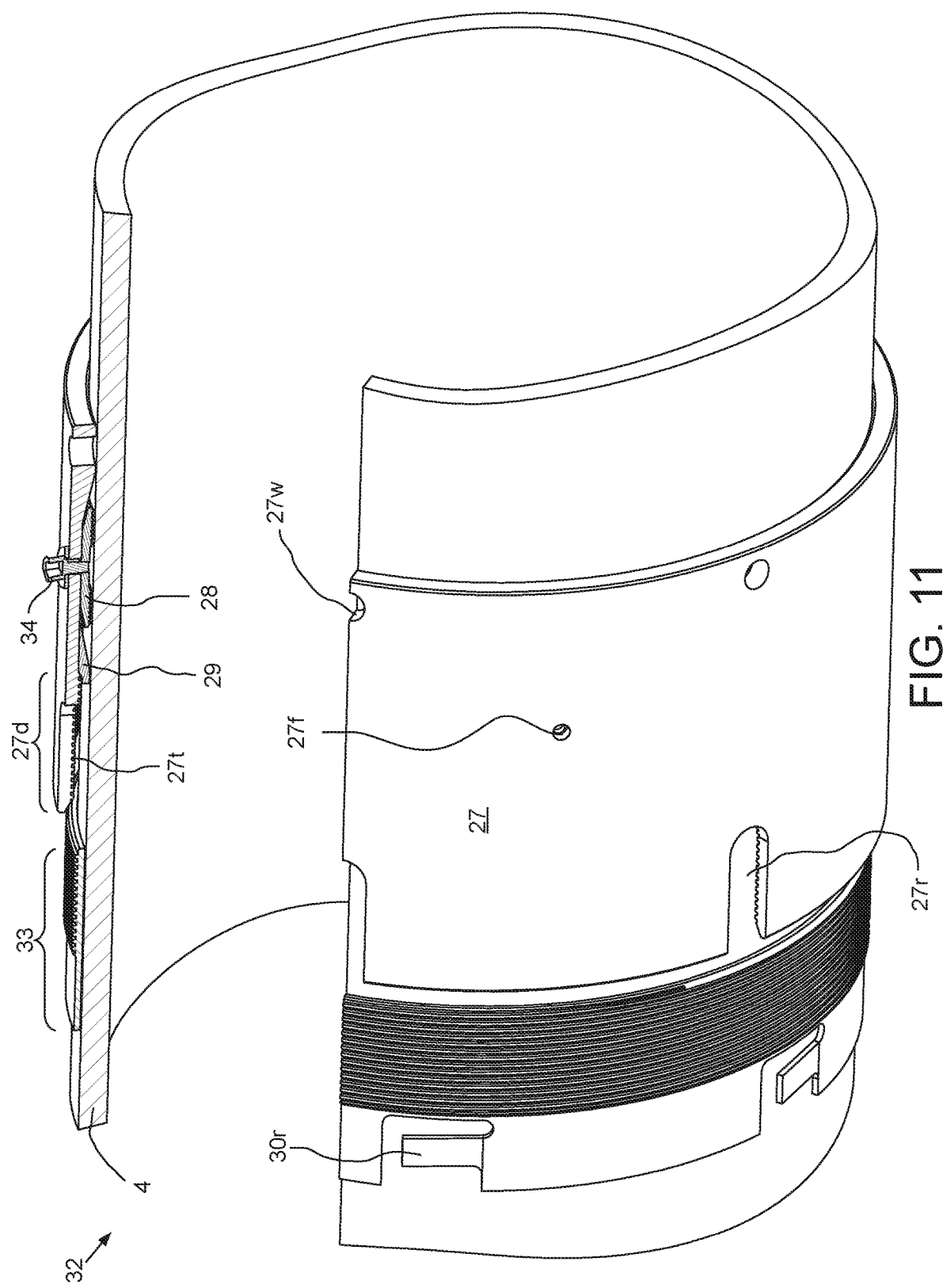
FIGS. 11-14 illustrates a sixth slimline stop collar having the fourth locking system, according to another embodiment of the present disclosure.

Referring specifically to FIG. 11, to begin assembly, the second slip ring 28 may be compressed so that the outer diameter of the central portion thereof is less than or equal to the minor diameter of the thread 27t of the fourth housing 27. The compressed second slip ring 28 may then be inserted through the thread 27t of the fourth housing 27 and along the bore of the first portion 7a of the fourth housing 27 until a distal one of the working portions of the second slip ring 28 enters the bore of the third portion 7c. This placement may allow sufficient room remaining in the first portion 7a for receiving the first portion of the third cam ring 29. The compressed second slip ring 28 may then be allowed to return to the natural position. The holes in the second slip ring 28 may be aligned with the first holes 27f in the fourth housing 27 and fasteners 34 (only one shown) may be inserted therethrough, thereby securing the second slip ring to the fourth housing and ensuring that the second slip ring does not catch the periphery of the downhole tubular 4 as the loosely fitted assembly is slid over the downhole tubular.

The third cam ring 29 may be compressed so that the outer diameter of the first portion thereof is less than or equal to the minor diameter of the thread 27t of the fourth housing 27. The first portion of the compressed third cam ring 29 may then be inserted through the thread 27t and into the bore of the first portion 7a of the housing 7. Once the first portion of the third cam ring 29 has cleared the thread 27t, the third cam ring 29 may be released and allowed to return to the natural position. The assembled fourth housing 27, the second slip ring 28, and the third cam ring may then be slid over the downhole tubular 4 until the end of the second portion 7b of the fourth housing 27 engages one of the thrust bearings 6a,b. The fifth bolt 33 may then be slid over the downhole tubular 4.

Figure 12:
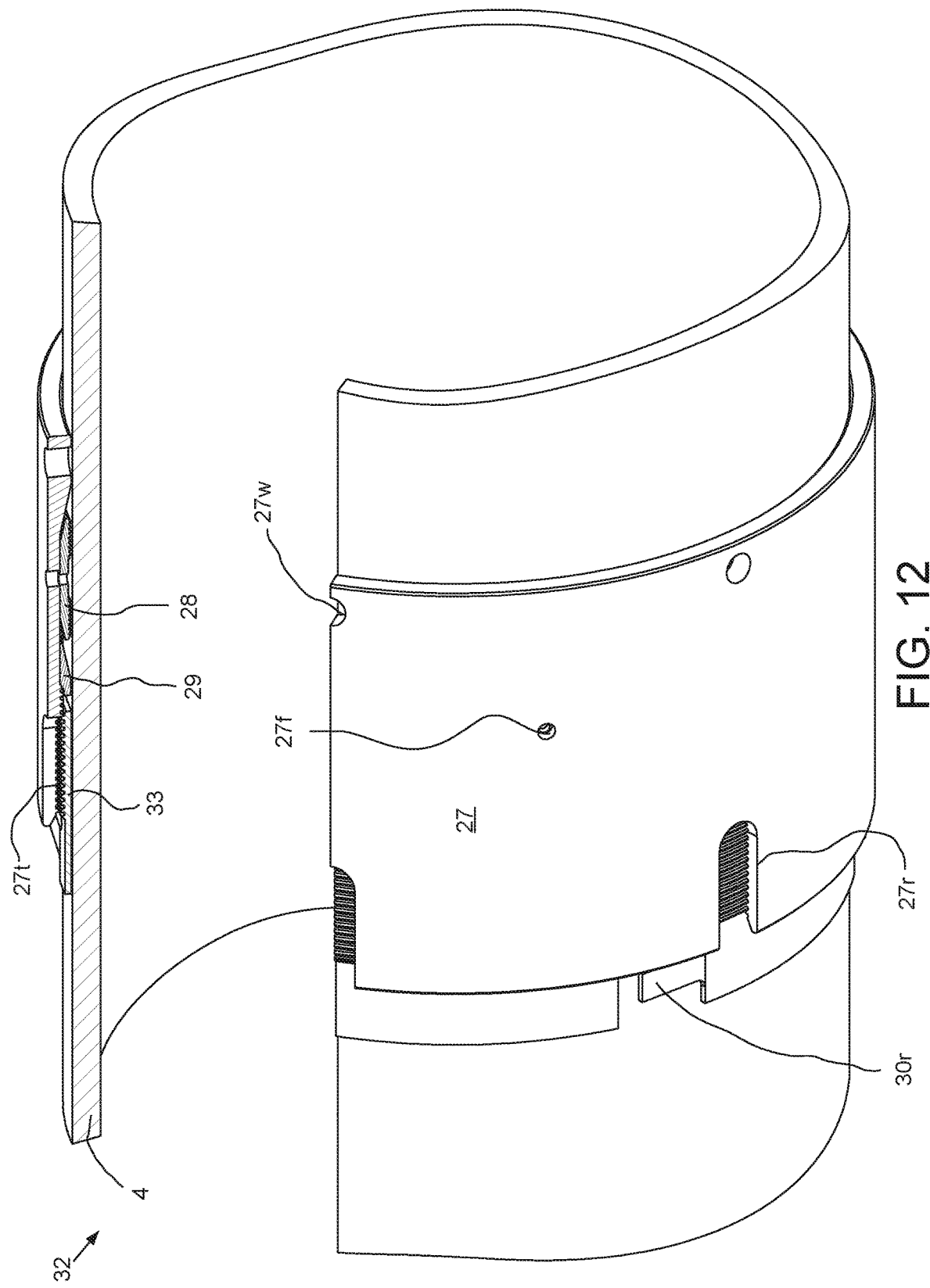

Referring specifically to FIG. 12, the fasteners 34 may be removed from the first holes 27f. The thread 10t of the fifth bolt 33 may be engaged with the housing thread 27t. A first pipe wrench may be engaged with the second holes 27w of the fourth housing 27. A second pipe wrench may then be engaged with the ratchet profile 30r of the fifth bolt 33 and the fifth bolt may be rotated relative to the fourth housing 27 in a tightening direction, thereby advancing the fifth bolt toward the fourth housing.

Figure 13:
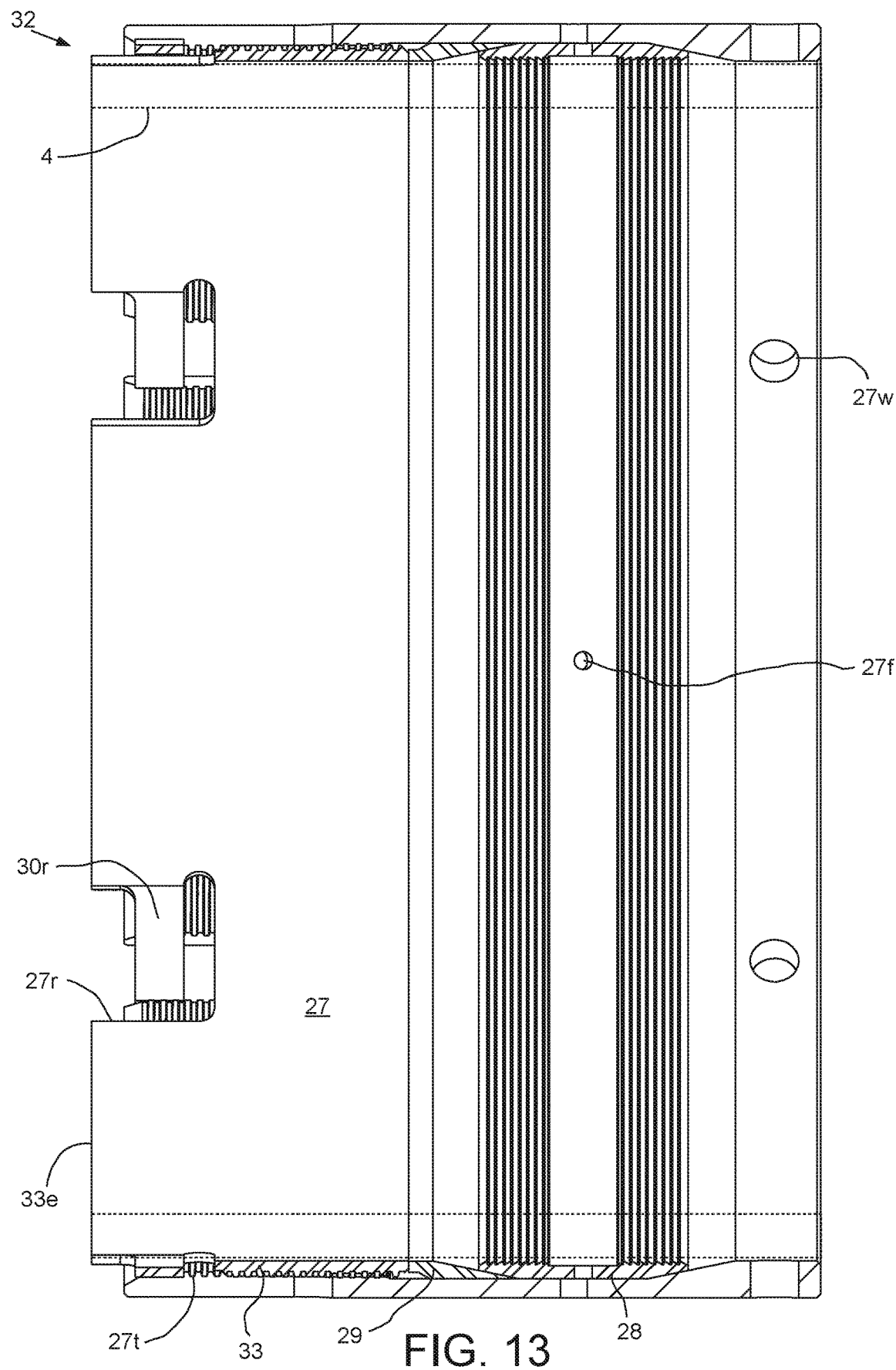

Referring specifically to FIG. 13, during continued rotation of the fifth bolt 33 relative to the fourth housing 27, the tabs of the ratchet profile 30r may engage the slots of the ratchet profile 27r. Since the fourth bolt 33 is being rotated in a tightening direction, a joined end of each tab may enter and exit the respective slot before the free end of the tab, thereby allowing walls of the slot to compress the tab so that rotation in the tightening direction is not obstructed. Also during continued rotation of the fifth bolt 33 relative to the fourth housing 27, an end of the first portion 10a of the fifth bolt may engage an end of the second portion of the third cam ring 29 and drive the third cam ring toward the second slip ring 28.

Figure 14:
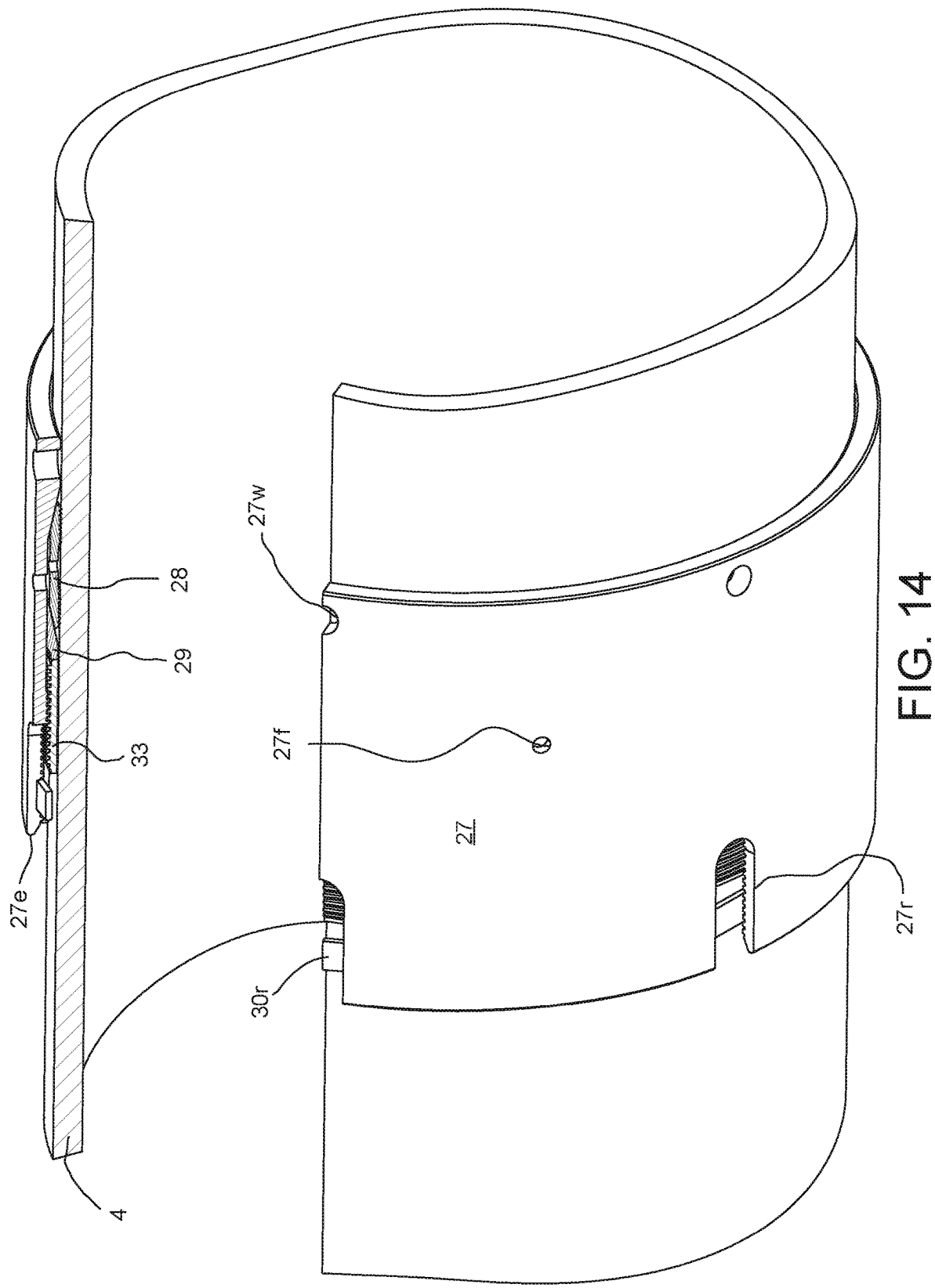

Referring specifically to FIG. 14, during continued rotation of the fifth bolt 33 relative to the fourth housing 27, the first portion of the third cam ring 29 may slide over the adjacent working portion of the second slip ring 28 until the mating tapered surfaces thereof engage, thereby driving the distal end surface thereof into engagement with the mating tapered surface of the third portion 7c of the fourth housing. During continued rotation of the fifth bolt 33 relative to the fourth housing 27, the first portion of the third cam ring 29 may continue to slide over the adjacent working portion of the second slip ring 28 and advancement of the second slip ring along the tapered inner surface of the third portion 7c of the fourth housing may continue, thereby radially compressing the second slip ring 28 toward the periphery of the downhole tubular 4. Radial compression of the second slip ring 28 may continue until the teeth thereof engage and penetrate the periphery of the downhole tubular 4, thereby longitudinally and torsionally mounting the sixth stop collar 32 to the downhole tubular.

Operation of the fourth locking system 27r, 30r prevents rotation of the fifth bolt 33 in the loosening direction during deployment of the centralizer 1, which could be caused by vibration. There may be some acceptable backlash until the ratchet profiles 27r, 30r engage depending on the relative positions of the fifth bolt 33 and the fourth housing 27 at full engagement of the second slip ring 28. As the second slip ring 28 is engaging the downhole tubular 4, the end 33e (FIG. 13) of the fifth bolt 33 adjacent to the ratchet profile 30r thereof may move past the end 27e of the fourth housing adjacent to the thread 27t such that the fifth bolt is completely disposed within the fourth housing. Containment of the fifth bolt 33 within the fourth housing 27 acts as a further safeguard to unintended rotation of the fifth bolt in the loosening direction, such as could otherwise happen by engagement of the fifth bolt with the wellbore wall or previously cemented casing string in the wellbore while the centralizer 1 is being rotated.

While the foregoing is directed to embodiments of the present disclosure, other and further embodiments of the disclosure may be devised without departing from the basic scope thereof, and the scope of the invention is determined by the claims that follow.

The invention claimed is:

1. A stop collar for mounting to a downhole tubular, comprising:
   a cylindrical housing having a threaded inner surface and a tapered inner surface;
   a compressible slip ring having teeth formed in an inner surface thereof and a pair of tapered outer surfaces;
   a compressible cam ring having a tapered inner surface; and
   a cylindrical bolt having a threaded outer surface,
   wherein:
      a natural outer diameter of each ring is greater than a minor diameter of the threaded surfaces, and
      screwing the threaded surfaces of the housing and the bolt is operable to drive the tapered surfaces together, thereby compressing the slip ring such that the teeth engage a periphery of the tubular; and
   a locking system operable to prevent unscrewing of the threaded surfaces of the housing and the bolt.

2. The stop collar of claim 1, wherein:
   each of the slip ring and the cam ring is partially split by a plurality of slots extending radially through a wall thereof, each slot extending from one end of the respective ring and terminating before reaching the other end of the respective ring, and
   the slots alternate between the ends of the respective ring.

3. The stop collar of claim 1, wherein each of the slip ring and the cam ring is split by a single slot extending radially through a wall thereof.

4. The stop collar of claim 1, wherein the tapered surfaces have corresponding angles relative to a longitudinal axis of the tubular and the angles each range between five and twenty-five degrees.

5. The stop collar of claim 1, wherein:
   the slip ring has a central portion with a constant diameter outer surface and a pair of working portions,
   each working portion has one of the tapered outer surfaces declining away from the central portion,
   each working portion has some of the teeth.

6. The stop collar of claim 1, wherein the locking system comprises:
   a torque profile formed in an end of the housing adjacent to the threaded surface thereof; and
   a lock ring having a ratchet profile formed therein and a torque profile formed in an end thereof,
   wherein the torque profiles are configured to mate.

7. The stop collar of claim 6, wherein:
   the locking system further comprises a ratchet profile formed in an outer surface of the bolt, and the ratchet profiles are configured such that rotation is allowed in a tightening direction of rotation of the bolt relative to the second housing but prevented in a loosening direction thereof.

8. The stop collar of claim 6, wherein:
the lock ring is an outer lock ring,
the locking system comprises:
   a torque profile formed in an outer surface of the bolt; and
   an inner lock ring having a ratchet profile formed in an outer surface thereof and a torque profile formed in an end thereof
wherein:
   the torque profiles of the inner lock ring and the bolt are configured to mate, and
   the ratchet profiles are configured such that rotation is allowed in a tightening direction of rotation of the bolt relative to the second housing but prevented in a loosening direction thereof.

9. The stop collar of claim 6, wherein the lock ring is split.

10. The stop collar of claim 1, wherein the locking system comprises:
a ratchet profile formed in the bolt adjacent to the threaded surface thereof, and
a ratchet profile formed in the housing and configured to engage the ratchet profile of the bolt as the threaded surfaces of the bolt and housing are screwed together.

11. A centralizer comprising:
a body having a plurality of blades forming a periphery thereof; and
a pair of the stop collars, each collar of claim 1 for mounting the centralizer body to the downhole tubular.

12. A centralizer comprising:
a body having a plurality of bow springs forming a periphery thereof; and
a stop collar of claim 1 for mounting the centralizer body to the downhole tubular by being disposed between ends of the body.

13. A stop collar for mounting to a downhole tubular, comprising:
a cylindrical housing having a threaded inner surface and a tapered inner surface;
a compressible slip ring having teeth formed in an inner surface thereof and a pair of tapered outer surfaces;
a compressible cam ring having a tapered inner surface; and
a cylindrical bolt having a threaded outer surface,
wherein:
   a natural outer diameter of each ring is greater than a minor diameter of the threaded surfaces, and
   screwing the threaded surfaces of the housing and the bolt is operable to drive the tapered surfaces together, thereby compressing the slip ring such that the teeth engage a periphery of the tubular; and
a locking system operable to prevent backward movement of the cam ring away from the slip ring,
wherein the locking system comprises a ratchet profile formed in an inner surface of the housing and a ratchet profile formed in an outer surface of the cam ring.

* * * * *